US009047705B1

(12) United States Patent
Ko

(10) Patent No.: US 9,047,705 B1
(45) Date of Patent: Jun. 2, 2015

(54) METHODS AND SYSTEMS FOR ELECTRONICALLY DISPLAYING FINANCIAL DATA

(71) Applicant: Citibank, N.A., New York, NY (US)

(72) Inventor: Thomas Ko, Monroe Township, NJ (US)

(73) Assignee: Citibank, N.A., New York, NY (US)

( * ) Notice: Subject to any disclaimer, the term of this patent is extended or adjusted under 35 U.S.C. 154(b) by 321 days.

(21) Appl. No.: 13/644,455

(22) Filed: Oct. 4, 2012

(51) Int. Cl.
*G06T 13/20* (2011.01)
*G06Q 40/00* (2012.01)

(52) U.S. Cl.
CPC ............. *G06T 13/20* (2013.01); *G06Q 40/00* (2013.01)

(58) Field of Classification Search
CPC .......................................... G06Q 40/00–40/12
See application file for complete search history.

(56) References Cited

U.S. PATENT DOCUMENTS

| | | | |
|---|---|---|---|
| 6,711,577 B1 | 3/2004 | Wong et al. | |
| 6,734,848 B2 | 5/2004 | Bires | |
| 7,181,406 B1 | 2/2007 | Modest | |
| 7,890,396 B2 | 2/2011 | Weinstein | |
| 7,937,309 B2 | 5/2011 | Bandman et al. | |
| 2002/0091728 A1 | 7/2002 | Kjaer et al. | |
| 2009/0006271 A1* | 1/2009 | Crowder | 705/36 R |
| 2009/0201294 A1 | 8/2009 | Hayes | |
| 2009/0259580 A1 | 10/2009 | Castiglione et al. | |
| 2010/0057618 A1 | 3/2010 | Spicer et al. | |
| 2011/0187710 A1 | 8/2011 | Giovinazzi | |
| 2011/0187711 A1 | 8/2011 | Giovinazzi et al. | |
| 2012/0030074 A1 | 2/2012 | Rotenberg | |
| 2012/0079431 A1* | 3/2012 | Toso | 715/836 |
| 2012/0197745 A1* | 8/2012 | Fisher et al. | 705/21 |

FOREIGN PATENT DOCUMENTS

EP    2182483 A1    5/2010

OTHER PUBLICATIONS

"Remittance Corridors," Apr. 2012, The Economist, retrieved on Oct. 16, 2014 from http://www.economist.com/node/21553458.*
Chang et al., "WireVis: Visualization of Categorical, Time-Varying Data From Financial Transactions," 2007, Visual Analytics Science and Technology, p. 155-162.*
Lux, M., "Visualization of Financial Information," ACM 1998 1-58113-051-1, pp. 58-61, NPIV '97 Las Vegas, Nevada.

(Continued)

*Primary Examiner* — Kee M Tung
*Assistant Examiner* — Ryan D McCulley
(74) *Attorney, Agent, or Firm* — John M. Harrington, Esq.; Johnson, Marcou & Isaacs, LLC

(57) ABSTRACT

Methods and systems for electronically displaying financial data involve, for example, providing access to an authorized user via a client computing device to financial data on a back-end server using a processor coupled to memory; likewise using the processor, sending the financial data to the client computing device from the back-end server; and also using the processor, rendering a three-dimensional graphic display showing a plurality of geographic locations associated with the financial data on the client computing device.

19 Claims, 8 Drawing Sheets

(56) References Cited

OTHER PUBLICATIONS

Roberts, P., "Information Visualization for Stock Market Ticks: Toward a New Trading Interface," Massachusetts Institute of Technology, Master of Science Thesis, Feb. 2004, pp. 1-83.

Sim, K. et al., "Discovering Correlated Subspace Clusters in 3D Continuous-Valued Data," 2010 IEEE 10$^{th}$ International Conference on Data Mining (ICDM), Dec. 13-17, 2010, pp. 471-480.

* cited by examiner

METHODS AND SYSTEMS FOR ELECTRONICALLY DISPLAYING FINANCIAL DATA

FIELD OF THE INVENTION

The present invention relates generally to the field of finance, and more particularly to methods and systems for electronically displaying financial data.

BACKGROUND OF THE INVENTION

The speed at which money is moved by a financial institution between a client's accounts within relatively close proximity to one another, such as from New Jersey to New York, is typically of no particular consequence. Thus, there is no reason for the financial institution to present real time electronic information to the client about the short distance over which the money is moved or the speed at which the money is moving over such short distances. However, when the distance over which the money is moved is much greater, such as from U.S. dollars in New York accounts to Australia, that distance may be an important data point to be articulated in electronic information presented to the client by the financial institution. For example, such data points may be essential in the client's understanding of the larger financial picture in making treasury-related financial decisions. However, that information cannot be articulated in a traditional bar graph or pie chart, or even in spreadsheets.

There is a present need for methods and systems for electronically displaying financial data that enables a holistic view of financial data or a drill down view into complicated and complex scenarios of the financial data that is not possible using traditional presentation methods.

SUMMARY OF THE INVENTION

Embodiments of the invention employ computer hardware and software, including, without limitation, one or more processors coupled to memory and non-transitory computer-readable storage media with one or more executable programs stored thereon which instruct the processors to perform the electronic display of financial data described herein.

Embodiments of the invention provide methods and systems for electronically displaying financial data that may involve, for example, providing access to an authorized user via a client computing device to financial data on a back-end server using a processor coupled to memory; sending the financial data to the client computing device from the back-end server, likewise using the processor; and rendering a three-dimensional graphic display showing a plurality of geographic locations associated with the financial data by the application on the client computing device, also using the processor.

In an aspect of embodiments of the invention, providing access to the authorized user via the client computing device may involve, for example, providing a download of an application to a client desktop computer, a client laptop computer, a client mobile telephonic device, or a client tablet computer. In another aspect, providing the download of the application may involve, for example, providing the download of the application as a portal view of a plurality of accounts of the client. In a further aspect, providing the download of the application may involve, for example, receiving set-up information from the client computing device consisting at least in part of an identification of a plurality of accounts of the client and an identification of at least one user authorized to access the plurality accounts of the client. In an additional aspect, sending the financial data to the client computing device may involve, for example, sending the financial data to the client computing device without requiring the financial data to be saved on the client computing device. In another aspect, sending the financial data from the back-end server may involve, for example, sending the financial data from at least one of a web server and a database.

In a further aspect of embodiments of the invention, rendering the three-dimensional graphic display showing the plurality of geographic locations may involve, for example, rendering a three-dimensional graphic display of a global to local map showing movement of value between at least two of the plurality of geographic locations from the financial data. In another aspect, rendering the three-dimensional graphic display of the global map showing movement of value between at least two of the geographic locations may involve, for example, rendering the three-dimensional graphic display of the global map showing movement of the value between an origination account of the client at a first geographic location and a destination account of the client at a second geographic location. In another aspect, rendering the three-dimensional graphic display of the global map showing movement of value between at least two of the geographic locations may involve, for example, rendering a three-dimensional graphic display of a tube or conduit representing the movement of value between at least two of the geographic locations.

In another aspect of embodiments of the invention, rendering the three-dimensional graphic display of the tube or conduit representing the movement of value may involve, for example, rendering the three-dimensional graphic display of a tube or conduit of a color indicative of a component of the movement of value. In an additional aspect, rendering the three-dimensional graphic display of a tube or conduit of the color indicative of the component of the movement of value may involve, for example, rendering the three-dimensional graphic display of a tube or conduit of a color indicative of past, present, or future financial flow, trade flow, or liquidity flow components of the movement of value. In a further aspect, rendering the three-dimensional graphic display of the tube or conduit representing the movement of value may involve, for example, rendering the three-dimensional graphic display of a tube or conduit of a size indicative of an aspect of the movement of value. In a still further aspect, rendering the three-dimensional graphic display of a tube or conduit of the size indicative of the aspect of the movement of value may involve, for example, rendering the three-dimensional graphic display of a tube or conduit of a size indicative of a quantity or volume aspect of the movement of value.

In an additional aspect of embodiments of the invention, rendering the three-dimensional graphic display of the tube or conduit representing the movement of value may involve, for example, rendering the three-dimensional graphic display of the tube or conduit associated with an animation feature indicative of an aspect of the movement of value. In another aspect, rendering the three-dimensional graphic display of the tube or conduit associated with the animation feature indicative of the aspect of the movement of value may involve, for example, rendering the three-dimensional graphic display of the tube or conduit associated with an animation feature indicative of a speed of the movement of value. In still another aspect, rendering the three-dimensional graphic display of a tube or conduit of the size indicative of the aspect of the financial data may involve, for example, rendering the three-dimensional graphic display of the tube or conduit associated with an arrow indicative of an aspect of the movement of value. In a still further aspect, rendering the three-dimensional graphic display of the tube or conduit associated with the arrow indicative of the aspect of the movement of value may involve, for example, rendering the three-dimensional graphic display of the tube or conduit associated with the arrow indicative of a direction aspect of the movement of value.

Still another aspect of embodiments of the invention may involve, for example, generating a textual display of a plurality of data points in association with the three-dimensional display from the financial data on the client computing device. A further aspect may involve, for example, receiving entry of a transaction related to at least one of a plurality of accounts of the client by the back-end server via the client computing device based at least in part on the three-dimensional graphic display. An additional aspect may involve, for example, rendering a three-dimensional graphic display of a bar graph showing trade data related to at least one of the plurality of accounts of the client from the financial data by the application on the client computing device. In a still further aspect, rendering the three-dimensional graphic display of the bar graph may involve, for example, rendering the three-dimensional graphic display of the bar graph showing three-dimensional bars representing positive values and three-dimensional bars representing negative values.

These and other aspects of the invention will be set forth in part in the description which follows and in part will become more apparent to those skilled in the art upon examination of the following or may be learned from practice of the invention. It is intended that all such aspects are to be included within this description, are to be within the scope of the present invention, and are to be protected by the accompanying claims.

DETAILED DESCRIPTION

Figure 1:
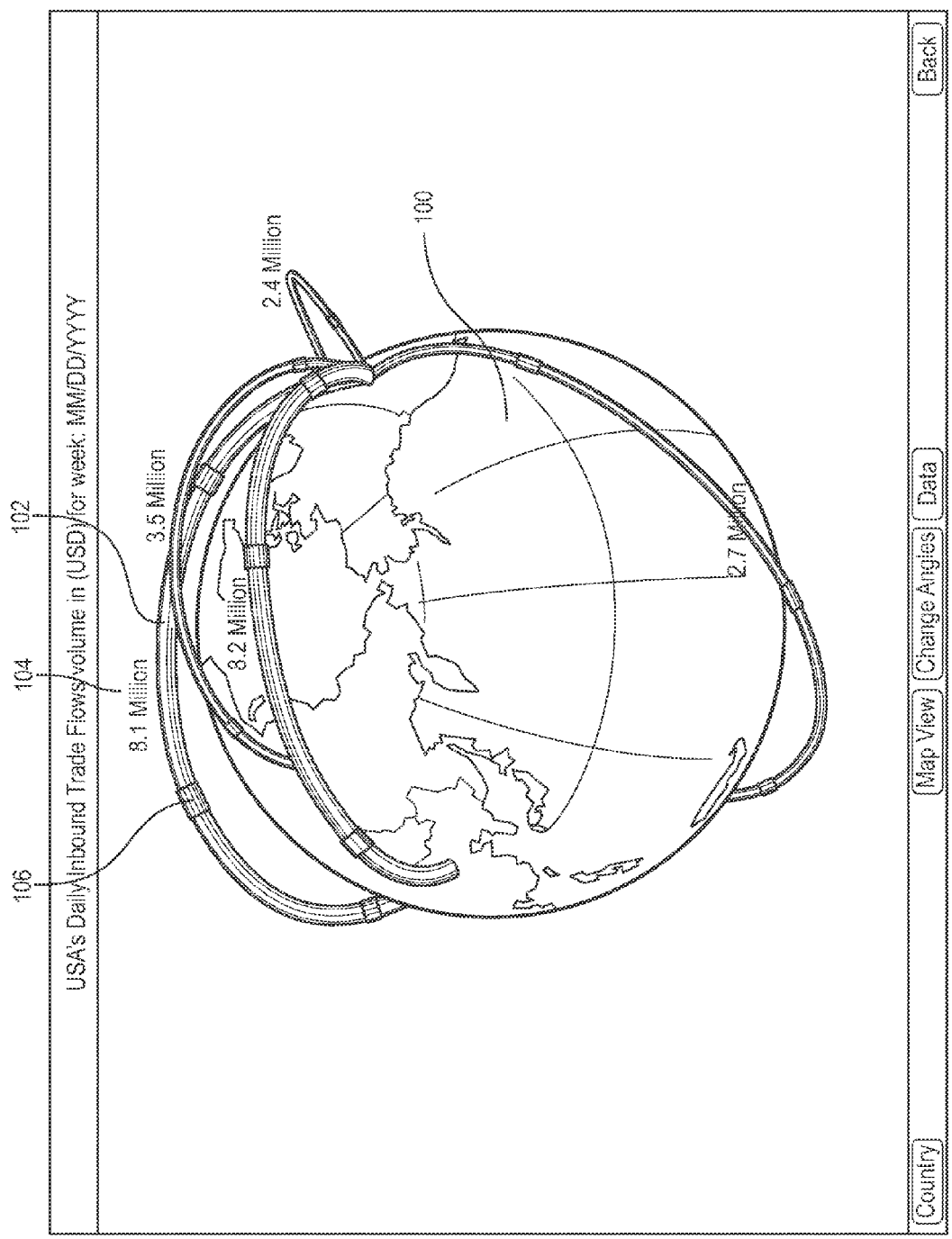
FIG. 1 illustrates an example of a 3D globe display shaded to show political subdivisions for embodiments of the invention and also showing daily inbound trade flow volume to the United States in U.S. dollars for a particular week.

Reference will now be made in detail to embodiments of the invention, one or more examples of which are illustrated in the accompanying drawings. Each example is provided by way of explanation of the invention, not as a limitation of the invention. It will be apparent to those skilled in the art that various modifications and variations can be made in the present invention without departing from the scope or spirit of the invention. For example, features illustrated or described as part of one embodiment can be used in another embodiment to yield a still further embodiment. Thus, it is intended that the present invention cover such modifications and variations that come within the scope of the invention.

In embodiments of the invention, components of the application software which render the graphics may be downloaded to a client's computing device, such as a tablet computer. Thereafter, data which is presented in the graphic display, such as three-dimensional (3D) maps having 3D tubes or conduits between originations and destinations on different portions of the 3D maps may be retrieved from a back-end server of the financial institution. However, the client's financial information is not downloaded or saved to the client's computing device but is instead maintained on the financial institution's back-end server. In embodiments of the invention, the client computing device of the user may comprise a desktop computer, a tablet computer, a mobile telephonic device or any other computing device, and the back end server may comprise, for example, one or more web servers and one or more databases.

Once the application for embodiments of the invention is downloaded and installed on the user's computing device, the user may launch the application on the user's computing device and proceed through a user setup process. In the setup process, the user may identify herself or himself with financial institution-provided user credentials. The financial institution may then find the user within its server and bring the user's entitlement information to show and confirm various products, such as payment, liquidity, trade, and accounts. The user may save his or her personal preferences during the setup process, which may be used for personalized views. The application may prompt the user to utilize a 'location' feature of his or her computing device and to accept a 'push notification' feature of the computing device. Once the user completes the configuration, the user may be challenged with 'terms and conditions' which the user must accept in order to launch the application. When the first-time setup process is completed, the user may be reverted to a login page on which the user may be challenged to login through a normal application authentication.

When the user logs on to the application for embodiments of the invention, the application may first check the user credentials. The application may relay the user's credentials to a back-end server, which may in turn send data to the application identifying the accounts and applicable authorizations or permissions for any particular activity regarding the accounts and the necessary data points with which create the visual display on the user's computing device. Such data points may include, without limitation, the account name or names, the currency of each account, the balance of each account, the daily total transaction volumes and values, and the daily total credits remaining in the accounts, any or all of which the application may use to create the visual display.

In embodiments of the invention, the user may be able to login using the user's current, valid credentials issued by the financial institution. When a user logs onto the application, the user may be directed to a landing homepage, which may display a menu from which the user may select, for example, a 3D global trade portfolio and flow management view display. The 3D global trade portfolio and flow management view display may include filtering option selections which may allow the user to view portfolios and flows, for example, by transaction, count, amount and any other criteria which may be used to represent the data, and analytics.

The application that is downloaded to the client's computing device may be referred to as a portal view of the client's accounts. Assume, for example, that a client has a corporate banking account and that a user is a person who represents the treasury office of the corporation. Assume further that the corporation has multiple financial accounts throughout the world in different currencies and that various movements of money from such accounts occur throughout the day on a daily basis. The application may consolidate all of the account information for such accounts and present the consolidated information for the user on the user's computing device in a graphical format on a 3D map of the world.

The presentation for embodiments of the invention may include various different data points which enable the user to assess the current availability of the corporation's funds and the movement of the corporation's funds in real time or very near real time. The presentation may also allow the user to drill down into certain portions of the data, for example, by country, currency, or account or any combination of those criteria. Alternatively, the presentation may allow the user to have a holistic view of the location of the corporation's money and the amount of the corporation's money at each location. Based on the presentation, the user may make a decision to enter one or more transactions, for example, to avoid exposure to risk in a particular currency by transferring money from a particular corporate account to an account in a different currency.

In embodiments of the invention, when the user downloads the software and performs the set-up-process, the user must identify herself or himself and the accounts which the corporation owns with the financial institution. The user may also be required to confirm the particular authorizations or permissions that are applicable to viewing the corporation's accounts. After the entitlements and configurations are established, the user may log in to the application and be presented with a 3D graphical overview of a summary of the locations and balances of the corporation's accounts and the current movement of the money to and from the corporation's accounts.

Using the application for embodiments of the invention, the user may perform various management functions and transactions. The user may have options, for example, to drill down into particular accounts or change the view from a current view to a historical view. In addition, the user may have other options to change the view in various ways depending on the particular information which the user may need. The user may also execute decisions, such as moving money from one or more accounts to one or more different accounts or initiating payments from a particular account to a third party or between corporate accounts within the financial institution. Further, the user may move money between branches or between accounts in different parts of the world. Instead of moving money, the user may, for example, simply check the status of particular pending items that are in the process of being executed.

Embodiments of the invention may involve, for example, presenting a 3D global map showing locations of cities and countries between which a client's money is moved. However, rather than simply showing the locations of such cities and countries, embodiments of the invention may also utilize financial information to generate a presentation in the form of a 3D tube or conduit corresponding to financial data related to movement of the client's money and to depict additional data points that are incapable of being adequately described in a spreadsheet. Such presentation may provide a holistic view of the movement of the client's money in a single 3D graphic display.

Embodiments of the invention provide a significant advantage over the currently available two-dimensional (2D) relationship displays of financial data by providing a presentation of multidimensional data points within a 3D map using 3D tubes between originations and destinations of money movements. Such presentation may be combined, for example, with the height and width of the 3D tubes, coloration of the 3D tubes, and animations associated with the 3D tubes to depict aspects such as the speed of money movements from the origination to the destination. Thus, embodiments of the invention enable depicting additional dimensions of data points to accurately represent the various different components of the financial data. In addition, the 3D graphic displays are rotational, which means that the displays are interactive in a manner that allows a user to drill down into the data represented by certain areas of the 3D tubes depicted in the displays. Thus, embodiments of the invention enable a user to choose a holistic view of the financial data or a drilled-down view into complicated and complex scenarios of the financial data that are not possible to present using traditional presentation methods, such as spreadsheets.

An aspect of the application for embodiments of the invention may involve, for example, both 3D and 2D representation of the financial institution's trade via a 3D world map or a 3D globe in relation to a flow view. The 3D map of the visual display may include 3D tubes extending between geographic locations that represent financial flows. For example, such 3D tubes may represent cash flows, such as payments issuing from or being received by an account. However, such payments may not necessarily be limited to cash payments in the sense of hard currency but may include cash payments as working capital or other form of liquidity. Instead of cash, such 3D tubes may represent trade related flows which involve 3D tubes depicting credit or open accounts, for example, for the corporation to execute a trade using credit that is extended by the financial institution.

Typically, a trade includes a shipment aspect, and the corporation may be receiving an extension of credit for the trade. In such a trade, there may be an origination and a destination between the corporation and the supplier of the subject matter of the trade. In the trade aspect, information regarding movement of the subject matter of the trade is obviously different from the cash flow, but the detailed movement characteristics of the trade may likewise be represented by the 3D tubes in the graphic display for embodiments of the invention. Trade flows may be somewhat like liquidity flows, which are somewhat different from cash flows. The liquidity type of movement of the corporation's working capital is more specific to the strategic positions of the corporation than to day-to-day day cash management. Thus, although the trade type of flow may be somewhat similar to cash flow, it shows a somewhat different aspect of the liquidity positions of the corporation.

In addition to a textual display of financial data associated with the 3D tubes on the graphic presentation for embodiments of the invention, 3D graphic aspects of the 3D tubes themselves convey financial information. Such information may include, for example, volume of cash flows, value of cash flows, types of entities involved in cash flows, and/or rate or timing of cash flows. The variables within the 3D graphic display for embodiments of the invention may include, for example, the width of 3D tubes, the height of 3D tubes, the colors of 3D tubes, and arrow directions associated with the 3D tubes between originations and destinations. For example, the arrow directions associated with the 3D tubes may indicate a direction of the flow. For another example, the width of the 3D tubes may indicate a value of the flow; the height of the 3D tubes may indicate the volume of the flow; and different colors of the 3D tubes may indicate the identity of different financial institutions involved in the flow. However, it is to be understood that foregoing is not intended to be limiting and that the different characteristics of the 3D tubes may represent any number of different aspects of the flows.

Figure 2:
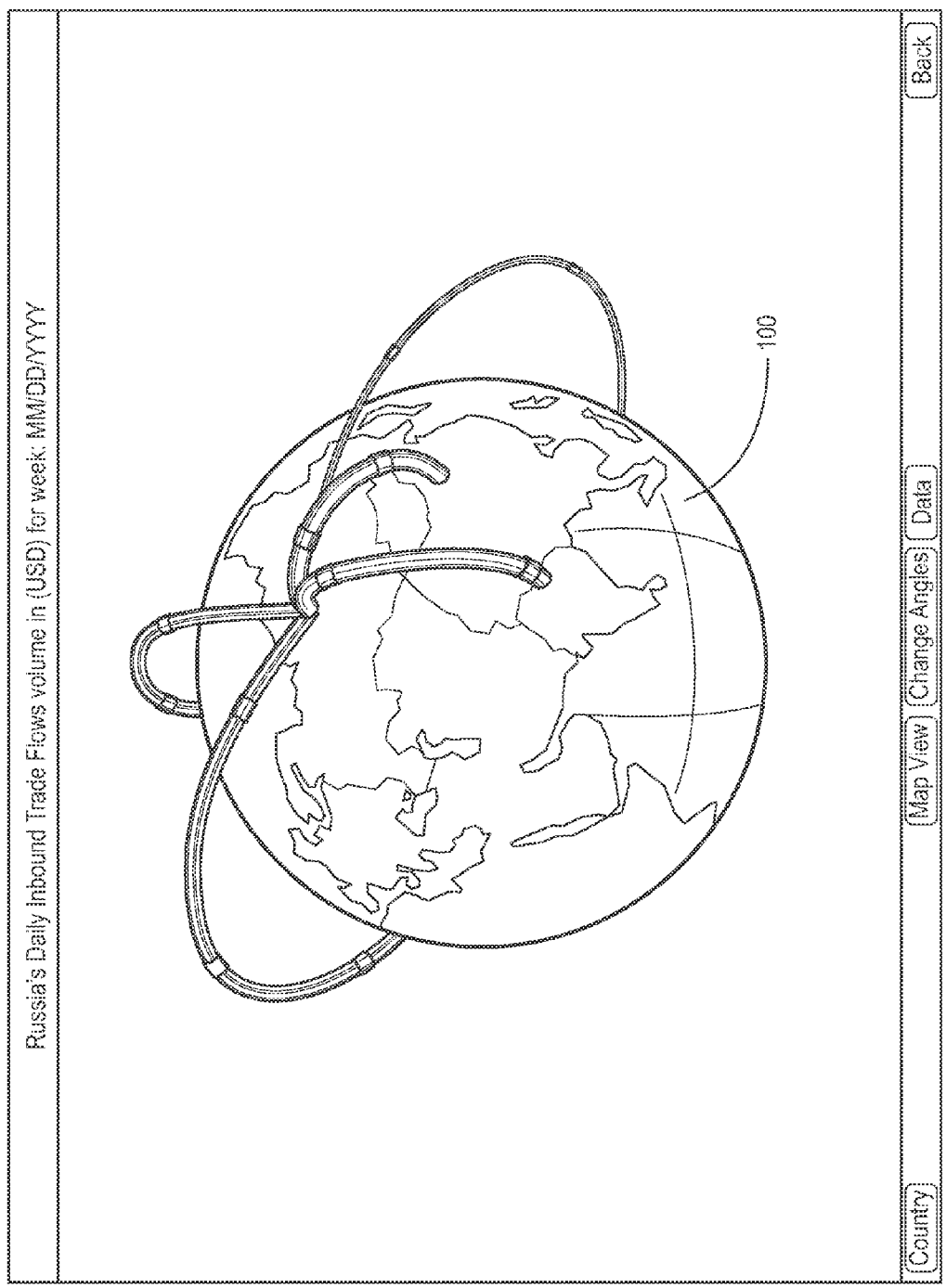
FIG. 2 illustrates an example of the 3D globe display shaded to show political subdivisions for embodiments of the invention and also showing daily inbound trade flow volume to Russia in U.S. dollars for a particular week.
Figure 3:
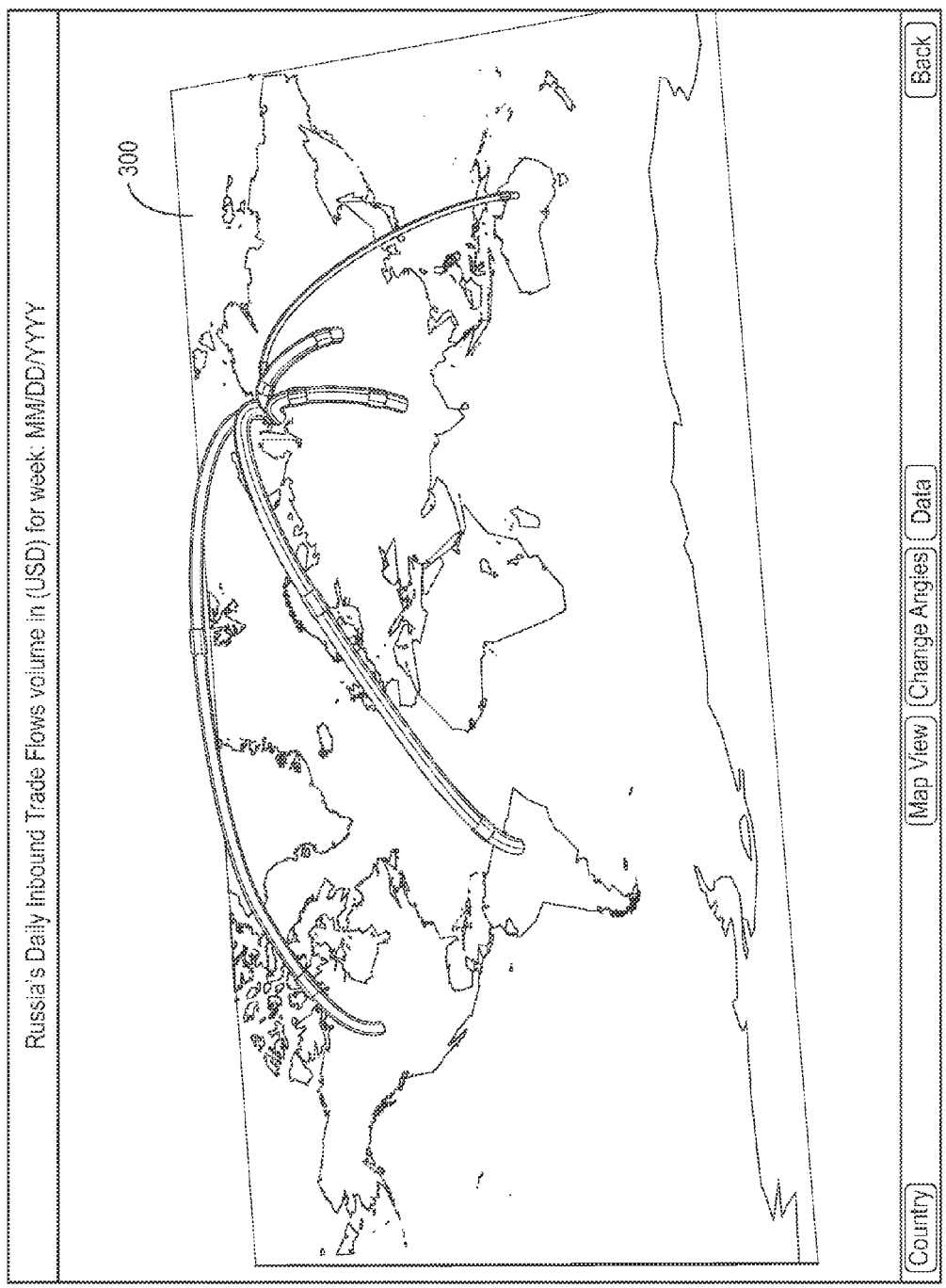
FIG. 3 illustrates an example of the 3D world map display shaded to show political subdivisions for embodiments of the invention and likewise showing the daily inbound trade flow volume to Russia in U.S. dollars for the particular week.

FIG. 1 illustrates an example of a 3D globe display shaded to show political subdivisions for embodiments of the invention and also showing daily inbound trade flow volume to the United States in U.S. dollars for a particular week. FIG. 2 illustrates an example of the 3D globe display shaded to show political subdivisions for embodiments of the invention and also showing daily inbound trade flow volume to Russia in U.S. dollars for a particular week. FIG. 3 illustrates an example of the 3D world map display shaded to show political subdivisions for embodiments of the invention and likewise showing the daily inbound trade flow volume to Russia in U.S. dollars for the particular week. In the 3D world map or 3D globe display aspect, the user may utilize a 3D world map 300 representation of the data as shown on FIG. 3, or a 3D globe 100 representation of the data as shown respectively in FIGS. 1 and 2, to display, for example, a value or count, a location, and transaction type for a specific time or a time interval of transaction flows between countries. In the 3D world map or 3D globe display aspect, the total value of transactions may be depicted by a width of a 3D tube or conduit 102 and displayed as a total amount of transactions 104 in a given time interval of transactions flows between countries as shown in FIG. 1. Since transactions may be denominated in various currencies, the application may convert the values and apply exchange rates to aggregate a total in a single base currency.

In such aspect, when a user selects, for example, 'total amount' as the criteria, the total value 104 may be displayed as data on the top of the 3D tube 102. When a user clicks 'total amount', the application may drill down to show, for example, a number of letters of credit, a total letter of credit value, and a total of beneficiary countries and/or regions. In the 3D world map or globe display aspect, the total count may also be depicted by the width of a 3D tube 102 and can be displayed as a total transaction count of a specific transaction type, such as letter of credit advice or bill presentation rather than a total aggregate of all the transaction activities associated with the primary transaction, such as amendment or adjustments in a given time interval. The 3D tube 102 for embodiments of the invention may have a drill down function which shows, for example, a percent of transactions advised through the financial institution versus those advised through other financial institutions. Alternatively, the respective percentages of transactions advised through the financial institution and other financial institutions may be represented by displaying two, differently color-coded 3D tubes. When the user selects 'total count' as the criteria, the total value 104 may be shown as data on the top of the 3D tube 102.

In the 3D world map or globe display aspect, a 3D tube 102 may have an indicator, such as a moving arrow or some other object 106, to represent a number of letters of credit that are flowing between countries. In addition, the speed or pace at which such moving arrow or other object 106 associated with the 3D tube 102 moves may depict the volume of the flow. Thus, if the letter of credit volume is low, the speed or pace at which the arrow or other object 106 moves between countries may be proportionately slow. On the other hand, if the letter of credit volume is moderate, the speed at which the arrow or object 106 moves between countries may be proportionately greater. Further, if the letter of credit volume is significantly greater, the speed at which the arrow or other object 106 moves between countries may likewise be significantly faster. In an aspect, the user may press and hold on the financial institution's 3D tube 102 to open a pop-up window displaying a 'country' letter of credit bar graph which shows a base month, year, and different product sets. The bar of the 'country' letter of credit bar graph may represent a total number of letters of credit, and a total value may be displayed on top of the bar. In the 3D world map or globe display aspect, the 3D images may be viewed from any angle as seen from FIGS. 1 and 2, and the surface of the 3D map 300 or 3D globe 100 may be displayed as shaded or natural, as well as with political subdivisions delineated with county labels or delineated only by continent or region, such as Europe, Asia, South America, and North America.

Another aspect of the application for embodiments of the invention may involve, for example, a 3D representation of the financial institution's monthly trade summary via 3D bar graphs in relation to an account view. The 3D bar graph feature of the graphic display for embodiments of the invention provides an additional dimension to a typical 2D bar graph. A 2D bar graph represents only two data points, such as X and Y, and it is difficult to illustrate another dimension of the data using only two dimensions. By providing another dimension in the form of the 3D bar graph, embodiments of the invention enable the presentation of data, such as trade data, in a more comprehensive manner. For example, assume that in addition to data regarding countries that are involved with a trade represented on an X axis and the values of the trade represented on a Y axis, a user also wishes to see weekly trade volume. Illustrating a relationship between all three data points in a traditional way using a 2D graph requires two different graphs. However, the 3D bar graph for embodiments of the invention enables the presentation of all three data points, X and Y, as well as Z, on a single 3D bar graph that is not possible using 2D graphs.

Figure 4:
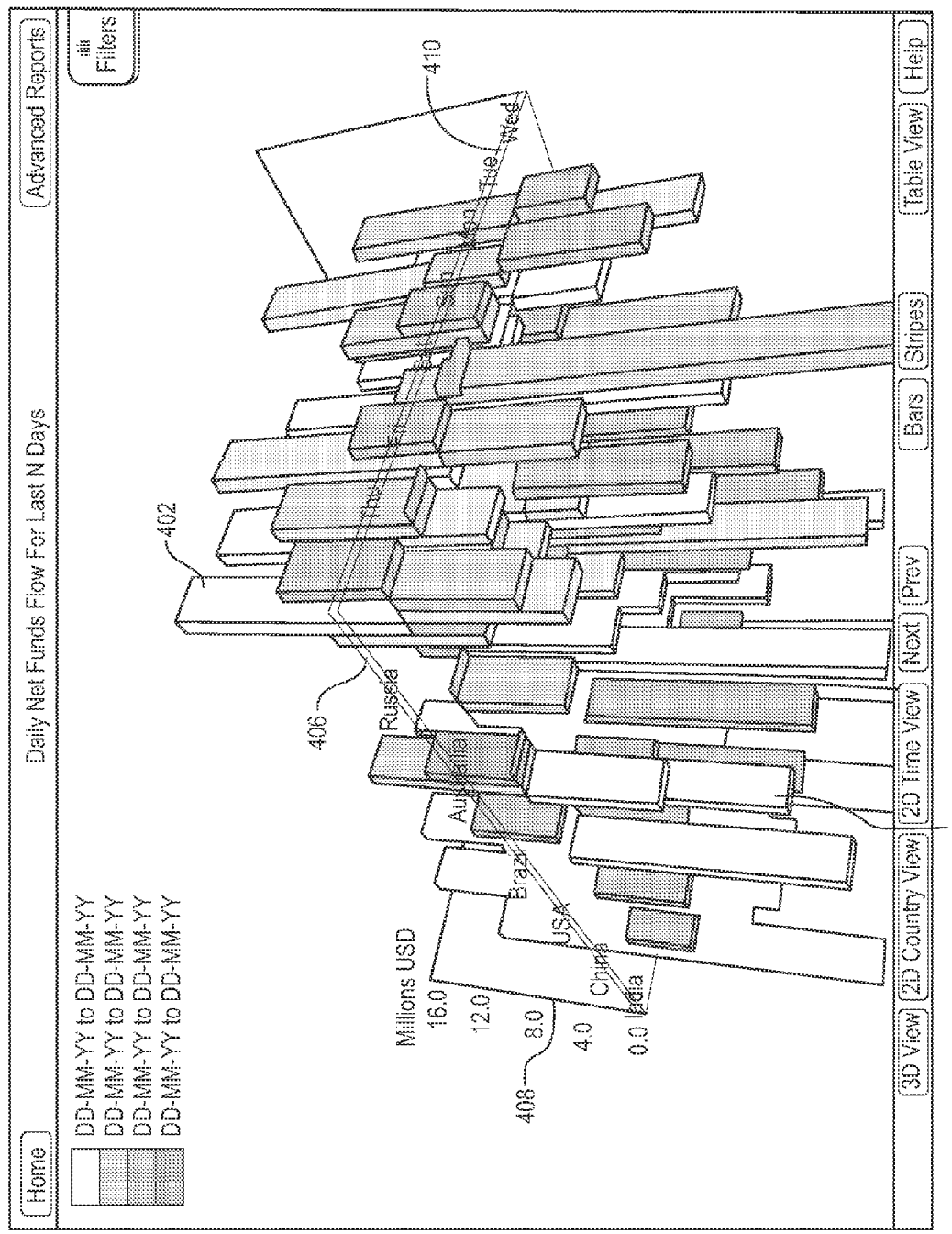
FIG. 4 illustrates an example of a 3D bar graph display having both positive and negative values for embodiments of the invention showing daily net fund flows in U.S. dollars for a particular period.

An aspect of the 3D bar graph presentation for embodiments of the invention may involve particular 3D bars above the horizontal axis of the presentation that indicate positive values and other 3D bars extending below the horizontal axis that indicate negative values. FIG. 4 illustrates an example of a 3D bar graph display having both positive 402 and negative 404 values for embodiments of the invention showing daily net fund flows in U.S. dollars for a particular period. Thus, it is possible for a particular account balance to be a negative amount that is less than zero from a cash point of view, for example, when a corporation uses a credit line with the financial institution. That may be an acceptable situation for the corporation, but the user needs to know when it occurs and precisely what it means. Traditionally, there has been no suitable way to show what such a negative cash position means in a graphical manner. However, extending a vertical axis of the 3D bar graph for embodiments of the invention in a negative direction to highlight cash positions below zero may provide greater insight to a user and enable the user to make appropriate financial decisions promptly.

Figure 5:
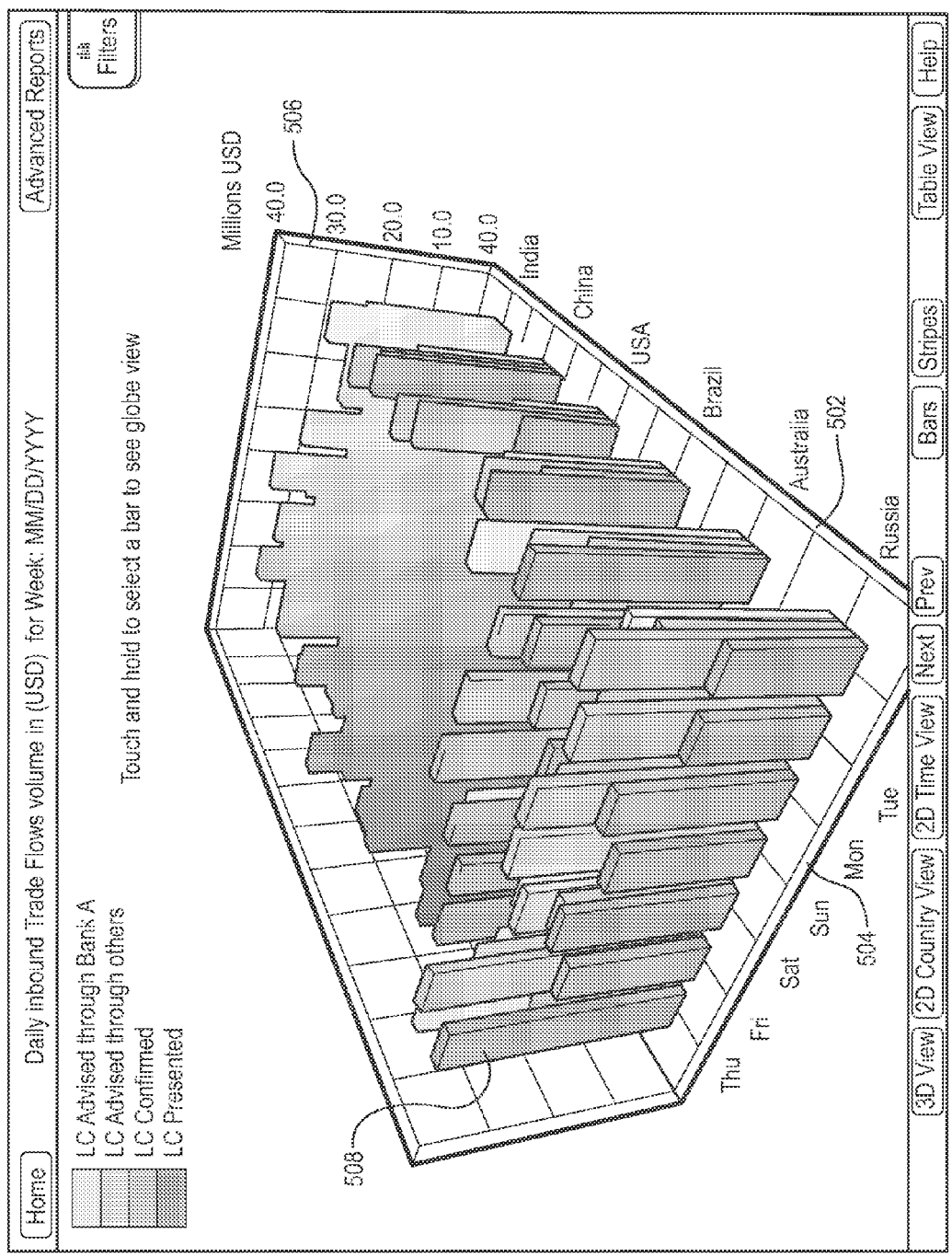
FIG. 5 illustrates an example of a frontal/rotational view of a 3D bar graph display for embodiments of the invention showing daily inbound trade flow volume in U.S. dollars for a particular week.
Figure 6:
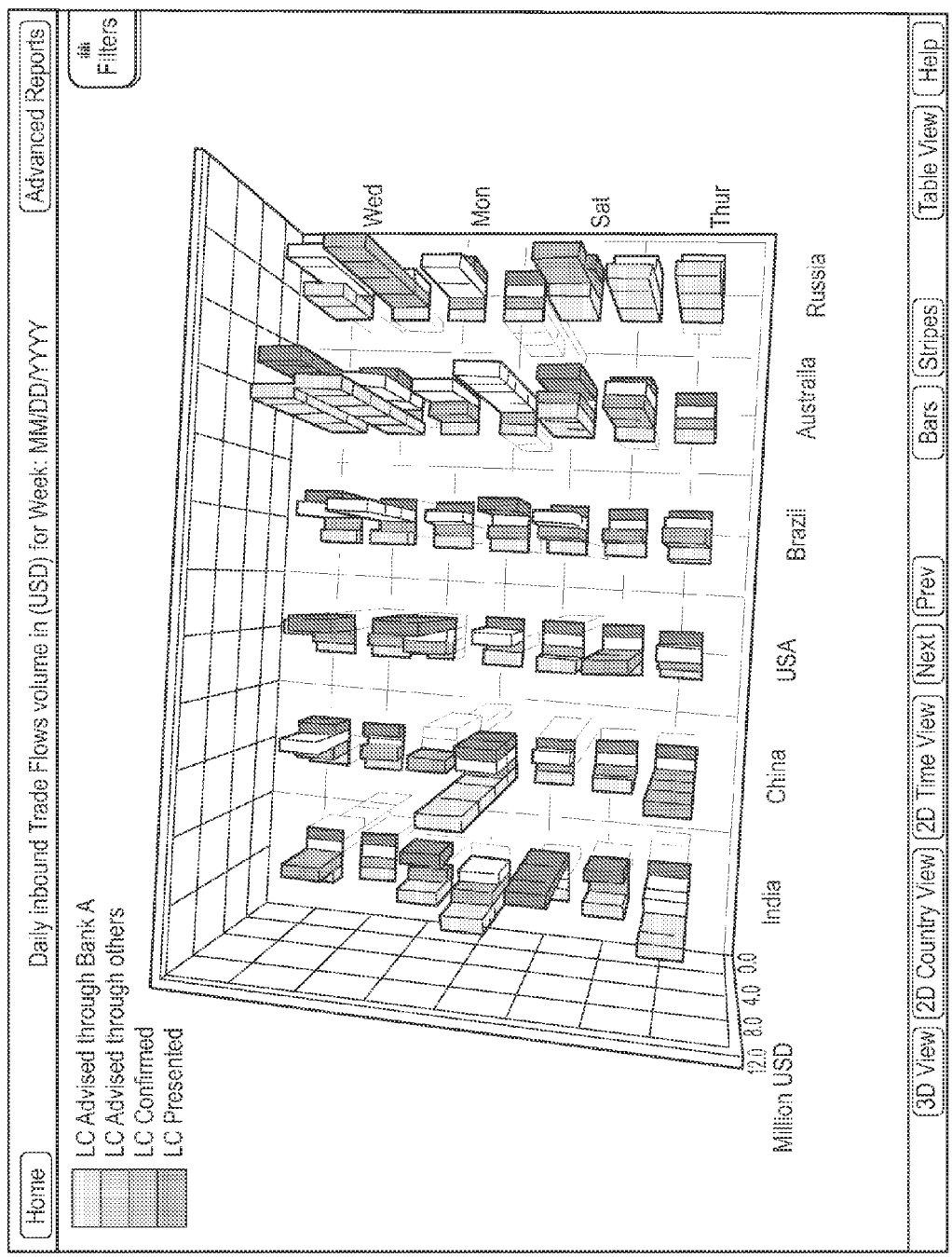
FIG. 6 illustrates an example of a birds-eye/rotational view of the 3D bar graph display of FIG. 5 for embodiments of the invention likewise showing daily inbound trade flow volume in U.S. dollars for the particular week.

In the 3D bar graph aspect of the invention, a first axis 406 may represent, for example, a particular country, a second axis 408 may represent a particular value, and a third axis 410 may represent a particular day. It is to be understood that any other combination of three data points may likewise by represented by the three respective axes of the 3D bar graph for embodiments of the invention. For example, other variables, including without limitation, quarters, values, volumes, and currencies may likewise be represented by various combinations of the three axes of the 3D bar graph. FIG. 5 illustrates an example of a frontal/rotational view of a 3D bar graph display for embodiments of the invention showing daily inbound trade flow volume in U.S. dollars for a particular week. Referring to FIG. 5, one of the horizontal axes 502 may represent countries and the other of the horizontal axes 504 days of the week. Further, the vertical axis 506 may represent inbound trade flow volume in U.S. dollars. The individual bars, such as individual bar 508, on the 3D bar graph display may be color-coded with different colors representing, for example, letters of credit advised through the financial institution, letters of credit advised through others, letters of credit confirmed, and letters of credit presented. FIG. 6 illustrates an example of a birds-eye/rotational view of the 3D bar graph display of FIG. 5 for embodiments of the invention likewise showing daily inbound trade flow volume in U.S. dollars for the particular week.

When the user utilizes the 3D bar graph representation of the data for embodiments of the invention, the information may be displayed, for example, by value or count, location, and transaction type for a specific time or interval of the transactions flows. In the 3D display aspect, the time parameter or interval may be depicted by a width of a 3D bar and may be displayed, for example, as daily, weekly, monthly, quarterly, yearly, or within a selected date. Also in the 3D display aspect, the value may be depicted by height of the 3D bar, such as 3D bar 508, and displayed as a total amount of transactions in a give time interval. Since transactions may be denominated in various currencies, the application may convert the values and apply exchange rates to aggregate a total in a single base currency. In the 3D display bar graph aspect, when a user selects, for example, 'total amount' as the criteria, the total value may be displayed as data on the top of the 3D bar. Also when a user clicks 'total amount', the application may drill down to show, for example, a number of letters of credit, a total letter of credit value, and the total of beneficiary countries or regions. The count may also be depicted by the height of the 3D bar and may be displayed as a total transaction count of a specific transaction type, such as letter of credit advice or bill presentation, instead of a total aggregate of all transaction activities associated with the primary transaction, such as amendments or adjustments, in a given time interval.

Further in the 3D bar graph display aspect, the 3D bar may have a drill down function in which a percent of the transactions advised through one financial institution versus the transactions advised through other financial institutions may be shown. When a user selects, for example, 'total count' as a criteria, the total count may likewise be shown as data on top of the 3D bar. The location may be depicted in the length of the 3D bar as a country or region in which the beneficiary of the letter of credit 'advised' resides or where the letter of credit presentation or bill payment took place. In addition, the transaction types may be depicted by individual 3D bars and in different colors to differentiate each transaction type. In a further aspect of the 3D bar graph display aspect, the 3D bar graph representation of the data may be changed to a visualization in one or more other 3D formats, such as a world map or globe. In addition, the 3D images may be viewed from any angle, as illustrated by FIGS. 5 and 6. The data presented via the 3D display aspect may also show trends of transaction flows within a time parameter or interval selected by the user, and the user may be able to display a detailed view of the data on the display screen of his or her computing device.

Figure 7:
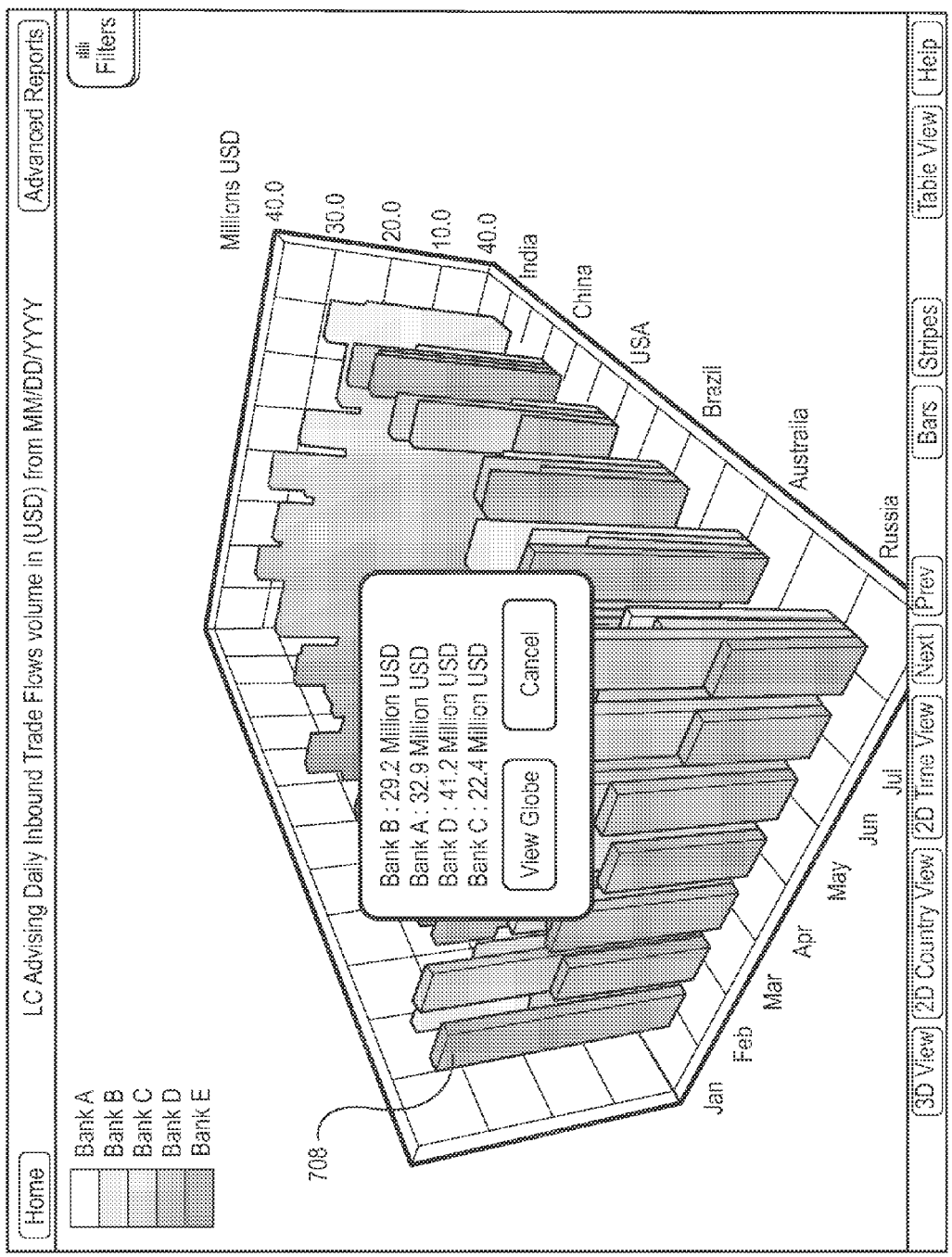
FIG. 7 illustrates an example of a frontal/rotational view of a 3D bar graph display for embodiments of the invention showing letters of credit advising daily trade flows volume in U.S. dollars for a particular week.

Another aspect of the application may involve, for example, a 3D bar graph representation of the financial institution's trade beneficiary country summary via 3D bar graphs in relation to an account view. FIG. 7 illustrates an example of a frontal/rotational view of a 3D bar graph display for embodiments of the invention showing letters of credit advising daily trade flows volume in U.S. dollars for a particular week. When the user utilizes the 3D bar graph representation of the data, the information may be displayed, for example, by value or count, location, advising bank, and transaction type for a specific time or interval of the transactions flows. In this aspect, the time parameter interval may likewise be depicted by a width of the 3D bar and may be displayed, for example, as daily, weekly, monthly, quarterly, yearly, or within a selected date. Also, the value may likewise be depicted by the height of a 3D, such as 3D bar 708, and displayed as a total amount of transactions in a give time interval. Because the transactions may be denominated in various currencies, the application may likewise convert the values and apply exchange rates to aggregate a total in a single base currency. When a user selects, for example, 'total amount' as the criteria, the total value may similarly be displayed as data on the top of the 3D bar.

Also in this aspect, when a user clicks 'total amount', the application may drill down to show, for example, a number of letters of credit, at total letter of credit value, and the total beneficiary countries and or regions. The count may also be depicted by the height of the 3D bars and may be displayed as a total transaction count of a specific transaction type, such as letter of credit advice or bill presentation, instead of a total aggregate of all transaction activities associated with the primary transaction, such as amendments or adjustments, in a give time interval. The 3D bar may have a drill down function in which a percent of the transactions advised through one financial institution and the percent advised through an advising financial institution may be shown. When a user selects, for example, 'total count' as a criteria, the total count may likewise be shown as data on top of the 3D bar. Further in this aspect, the location may be depicted in a horizontal axis of the 3D bar graph as the country or region in which the beneficiary of the letter of credit advised resides or where the letter of credit presentation/bill payment took place. In addition, the transaction types may be a part of a filter criteria, and individual 3D bars may represent each of a number of advising banks in different colors to differentiate them. Also, the 3D bar graph representation of the data may be changed to a visualization in one or more other 3D formats, such as a world map or globe, and the 3D images may be viewed from any angle.

Figure 8:
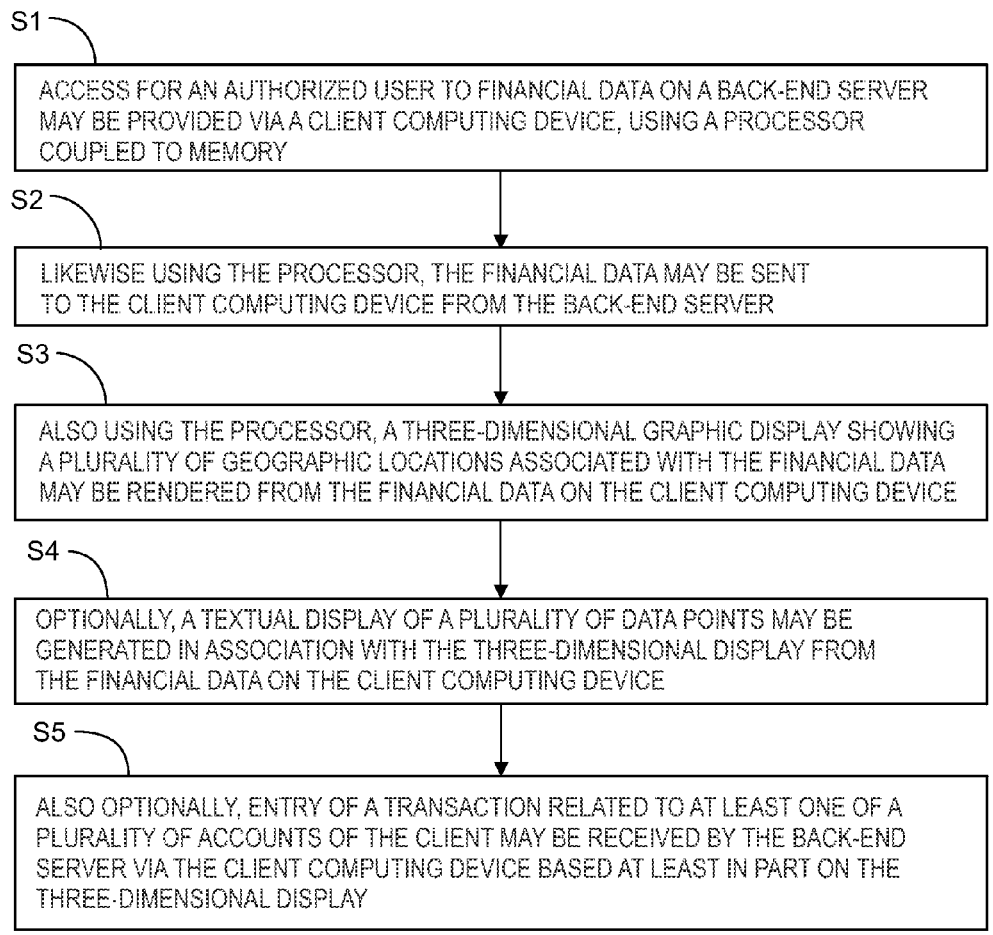
FIG. 8 is a flow chart which illustrates an example of the process of electronically displaying financial data for embodiments of the invention.

FIG. 8 is a flow chart which illustrates an example of the process of electronically displaying financial data for embodiments of the invention. Referring to FIG. 8, at S1, access for an authorized user to financial data on a back-end server may be provided via a client computing device, using a processor coupled to memory. At S2, likewise using the processor, the financial data may be sent to the client computing device from the back-end server. At S3, also using the processor, a three-dimensional graphic display showing a plurality of geographic locations associated with the financial data may be rendered on the client computing device. At S4, optionally, a textual display of a plurality of data points may be generated in association with the three-dimensional display from the financial data on the client computing device. S5, also optionally, entry of a transaction related to at least one of a plurality of accounts of the client may be received by the back-end server via the client computing device based at least in part on the three-dimensional graphic display.

It is to be understood that embodiments of the invention may be implemented as processes of a computer program product, each process of which is operable on one or more processors either alone on a single physical platform, such as a personal computer, or across a plurality of platforms, such as a system or network, including networks such as the Internet, an intranet, a WAN, a LAN, a cellular network, or any other suitable network. Embodiments of the invention may employ client devices that may each comprise a computer-readable medium, including but not limited to, random access memory (RAM) coupled to a processor. The processor may execute computer-executable program instructions stored in memory. Such processors may include, but are not limited to, a microprocessor, an application specific integrated circuit (ASIC), and or state machines. Such processors may comprise, or may be in communication with, media, such as computer-readable media, which stores instructions that, when executed by the processor, cause the processor to perform one or more of the steps described herein.

It is also to be understood that such computer-readable media may include, but are not limited to, electronic, optical, magnetic, RFID, or other storage or transmission device capable of providing a processor with computer-readable instructions. Other examples of suitable media include, but are not limited to, CD-ROM, DVD, magnetic disk, memory chip, ROM, RAM, ASIC, a configured processor, optical media, magnetic media, or any other suitable medium from which a computer processor can read instructions. Embodiments of the invention may employ other forms of such computer-readable media to transmit or carry instructions to a computer, including a router, private or public network, or other transmission device or channel, both wired or wireless. Such instructions may comprise code from any suitable computer programming language including, without limitation, C, C++, C#, Visual Basic, Java, Python, Perl, and JavaScript.

It is to be further understood that client devices that may be employed by embodiments of the invention may also comprise a number of external or internal devices, such as a mouse, a CD-ROM, DVD, keyboard, display, or other input or output devices. In general such client devices may be any suitable type of processor-based platform that is connected to a network and that interacts with one or more application programs and may operate on any suitable operating system. Server devices may also be coupled to the network and, similarly to client devices, such server devices may comprise a processor coupled to a computer-readable medium, such as a random access memory (RAM). Such server devices, which may be a single computer system, may also be implemented as a network of computer processors. Examples of such server devices are servers, mainframe computers, networked computers, a processor-based device, and similar types of systems and devices.

What is claimed is:

1. A method for electronically displaying financial data, comprising:
    providing, using a processor coupled to memory, access to an authorized user via a client computing device to financial data on a back-end server;
    sending, using the processor, the financial data to the client computing device from the back-end server;
    rendering, using the processor, a three-dimensional graphic display showing a plurality of geographic locations associated with the financial data on the client computing device; and
    activating, by the processor, a three-dimensional visualization of a tube or conduit representing a movement of value between at least two of the plurality of geographic locations, and animating an element of the tube or conduit to move in a direction of the movement of value between the at least two of the plurality of geographic locations at a rate of speed that is proportional to a volume of the movement of value between the at least two of the plurality of geographic locations.

2. The method of claim 1, wherein providing access to the authorized user via the client computing device further comprises providing a download of an application to one of a client desktop computer, a client laptop computer, a client mobile telephonic device, and a client tablet computer.

3. The method of claim 2, wherein providing the download of the application further comprises providing the download of the application as a portal view of a plurality of accounts of the client.

4. The method of claim 2, wherein providing the download of the application further comprises receiving set-up information from the client computing device consisting at least in part of an identification of a plurality of accounts of the client and an identification of at least one user authorized to access the plurality accounts of the client.

5. The method of claim 1, wherein sending the financial data to the client computing device further comprises sending the financial data to the client computing device without requiring the financial data to be saved on the client computing device.

6. The method of claim 1, wherein sending the financial data from the back-end server further comprises sending the financial data from at least one of a web server and a database.

7. The method of claim 1, wherein rendering the three-dimensional graphic display showing the plurality of geographic locations further comprises rendering a three-dimensional graphic display of a global to local map showing movement of value between at least two of the plurality of geographic locations from the financial data.

8. The method of claim 7, wherein rendering the three-dimensional graphic display of the global map showing movement of value between at least two of the geographic locations further comprises rendering the three-dimensional graphic display of the global map showing movement of the value between an origination account of the client at a first geographic location and a destination account of the client at a second geographic location.

9. The method of claim 1, wherein activating the three-dimensional visualization of the tube or conduit representing the movement of value further comprises activating the three-dimensional graphic display of a the tube or conduit of a color indicative of an identity of a financial institution as a source or destination of the movement of value.

10. The method of claim 1, wherein activating the three-dimensional visualization of the tube or conduit representing the movement of value further comprises activating the three-dimensional visualization of the tube or conduit of a color indicative of past, present, or future financial flow, trade flow, or liquidity flow components of the movement of value.

11. The method of claim 1, wherein activating the three-dimensional visualization of the tube or conduit representing the movement of value further comprises activating the three-dimensional graphic display of a tube or conduit of a size indicative of an aspect of the movement of value.

12. The method of claim 11, wherein activating the three-dimensional visualization of the tube or conduit of the size indicative of the aspect of the movement of value further comprises rendering the three-dimensional graphic display of a tube or conduit of a size indicative of a quantity or volume aspect of the movement of value.

13. The method of claim 1, wherein activating the three-dimensional visualization of the tube or conduit representing the movement of value further comprises activating the three-dimensional visualization of the tube or conduit associated with an arrow indicative of an aspect of the movement of value.

14. The method of claim 13, wherein activating the three-dimensional visualization of the tube or conduit associated with the arrow indicative of the aspect of the movement of value further comprises activating the three-dimensional visualization of the tube or conduit associated with the arrow indicative of a direction aspect of the movement of value.

15. The method of claim 1, further comprising generating a textual display of a plurality of data points in association with the three-dimensional display from the financial data on the client computing device.

16. The method of claim 1, further comprising receiving entry of a transaction related to at least one of a plurality of accounts of the client by the back-end server via the client computing device based at least in part on the three-dimensional graphic display.

17. The method of claim 1, further comprising rendering a three-dimensional graphic display of a bar graph showing trade data related to at least one of a plurality of accounts of the client from the financial data on the client computing device.

18. The method of claim 17, wherein rendering the three-dimensional graphic display of the bar graph further comprises rendering the three-dimensional graphic display of the bar graph showing three-dimensional bars representing positive values and three-dimensional bars representing negative values.

19. A system for electronically displaying financial data, comprising:
 a processor coupled to memory, said processor being programmed for:
  providing access to an authorized user via a client computing device to financial data on a back-end server;
  sending the financial data to the client computing device from the back-end server;
 rendering a three-dimensional graphic display showing a plurality of geographic locations associated with the financial data on the client computing device; and
 activating a three-dimensional visualization of a tube or conduit representing a movement of value between at least two of the plurality of geographic locations, and animating an element of the tube or conduit to move in a direction of the movement of value between the at least two of the plurality of geographic locations at a rate of speed that is proportional to a volume of the movement of value between the at least two of the plurality of geographic locations.

* * * * *